(12) United States Patent
Liao et al.

(10) Patent No.: US 10,002,404 B2
(45) Date of Patent: Jun. 19, 2018

(54) OPTIMIZING SHADING PROCESS FOR MIXED ORDER-SENSITIVE AND ORDER-INSENSITIVE SHADER OPERATIONS

(71) Applicant: MediaTek Singapore Pte. Ltd., Singapore (SG)

(72) Inventors: Qun-Feng Liao, San Jose, CA (US); Cheng-Ying Ko, Cupertino, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 49 days.

(21) Appl. No.: 14/687,832

(22) Filed: Apr. 15, 2015

(65) Prior Publication Data
US 2016/0307365 A1 Oct. 20, 2016

(51) Int. Cl.
*G06T 1/60* (2006.01)
*G06T 15/83* (2011.01)
*G06T 1/20* (2006.01)
*G06T 15/00* (2011.01)
*G06T 15/50* (2011.01)

(52) U.S. Cl.
CPC ............ *G06T 1/60* (2013.01); *G06T 1/20* (2013.01); *G06T 15/005* (2013.01); *G06T 15/503* (2013.01); *G06T 15/83* (2013.01)

(58) Field of Classification Search
CPC .................. G06T 15/83; G06T 1/60
USPC ........................................ 345/426
See application file for complete search history.

(56) References Cited

U.S. PATENT DOCUMENTS

| | | | |
|---|---|---|---|
| 7,477,266 B1 | 1/2009 | Bastos | |
| 7,576,746 B1 * | 8/2009 | Andrews | G06T 15/005 345/418 |
| 7,619,687 B1 | 11/2009 | Lew | |
| 7,973,797 B2 | 7/2011 | Jiao | |
| 2002/0196251 A1 * | 12/2002 | Duluk, Jr. | G06T 1/60 345/420 |
| 2006/0055695 A1 * | 3/2006 | Abdalla | G06T 11/40 345/426 |
| 2007/0146378 A1 * | 6/2007 | Sorgard | G06T 15/00 345/581 |

(Continued)

*Primary Examiner* — Devona Faulk
*Assistant Examiner* — Hai Tao Sun
(74) *Attorney, Agent, or Firm* — The Law Office of Tong Lee

(57) ABSTRACT

A graphics processing unit (GPU) includes programmable shader hardware and grouping hardware. The grouping hardware receives pixels collected from a set of primitives, wherein pixel locations of each primitive have been obtained through rasterization of a set of vertices of the primitive. The grouping hardware also groups the pixels into a set of groups having a sequential order. None of the pixels in each group overlapped with each other in a display and overlapped pixels belong to different groups. The programmable shader hardware performs order-insensitive shader operations on the groups according to a first subset of an instruction set defined for a programmable shader, with two or more of the groups processed in parallel. The programmable shader hardware also performs order-sensitive shader operations on each of the groups in the sequential order according to a second subset of the instruction set defined for the programmable shader.

14 Claims, 6 Drawing Sheets

(56) References Cited

U.S. PATENT DOCUMENTS

| | | | | |
|---|---|---|---|---|
| 2007/0257905 | A1* | 11/2007 | French | G06T 15/005 345/419 |
| 2009/0310151 | A1* | 12/2009 | Nordback | G06T 11/001 358/1.9 |
| 2014/0115531 | A1* | 4/2014 | Zhang | G06T 15/503 715/790 |

* cited by examiner

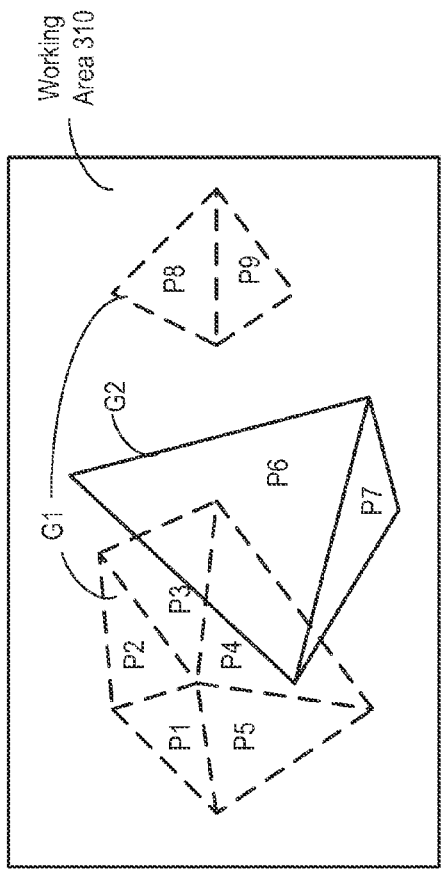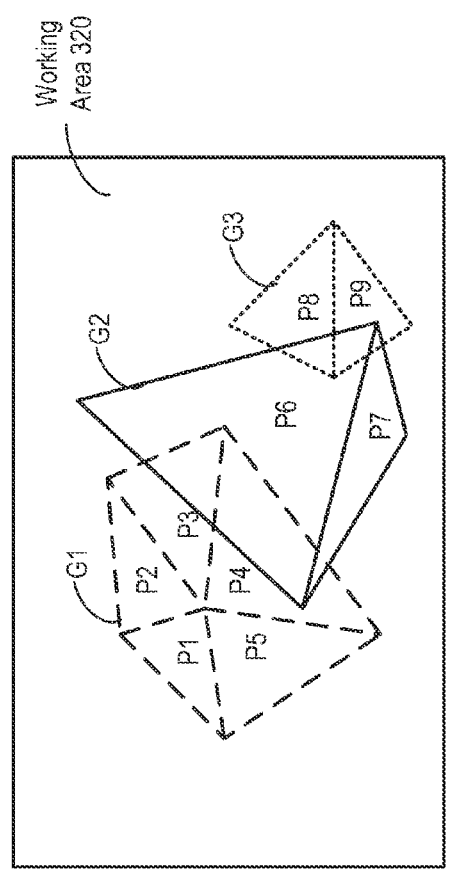

OPTIMIZING SHADING PROCESS FOR MIXED ORDER-SENSITIVE AND ORDER-INSENSITIVE SHADER OPERATIONS

TECHNICAL FIELD

Embodiments of the invention relate to a graphics processing system; and more specifically, to a programmable shader in graphics processing.

BACKGROUND

In computer graphics, rendering is the process of producing images on a display device from descriptions of graphical objects or models. A graphics processing unit (GPU) renders 3D graphical objects, which is often represented by a combination of primitives such as points, lines, polygons, and higher order surfaces, into picture elements (pixels).

A GPU typically includes a rendering pipeline to perform the rendering operations. A rendering pipeline includes the following main stages: (1) vertex processing, which processes and transforms the vertices (that describe the primitives) into a projection space, (2) rasterization, which converts each primitive into a set of 3D pixels, which is aligned with the pixel grid on the display device with attributes such as 3D position, color, normal and texture, (3) fragment processing, which processes each individual set of 3D pixels, and (4) output processing, which combines the 3D pixels of all primitives into the 2D space for display.

When a graphical object is not completely opaque, some of its background can show through and blends into the object. Blending combines pixel values (e.g., the Red, Green and Blue (RGB) color values) in each pixel location to produce a final pixel value for display. Conventionally, blending is performed by fixed-function hardware after fragment processing in the output processing stage. Fixed-function hardware is typically more costly and less flexible than programmable hardware.

SUMMARY

In one embodiment, a method of a GPU is provided. The method comprises the step of receiving pixels collected from a set of primitives, wherein pixel locations of each primitive have been obtained through rasterization of a set of vertices of the primitive; grouping the pixels into a set of groups having a sequential order, wherein none of the pixels in each group overlapped with each other in a display and overlapped pixels belong to different groups; performing order-insensitive shader operations on the groups according to a first subset of an instruction set defined for a programmable shader, with two or more of the groups processed in parallel; and performing order-sensitive shader operations on each of the groups in the sequential order according to a second subset of the instruction set defined for the programmable shader.

In another embodiment, a GPU is provided. The GPU comprises grouping hardware operative to receive pixels collected from a set of primitives, wherein pixel locations of each primitive have been obtained through rasterization of a set of vertices of the primitive. The grouping hardware is also operative to group the pixels into a set of groups having a sequential order. None of the pixels in each group overlapped with each other in a display and overlapped pixels belong to different groups. The GPU also comprises programmable shader hardware coupled to the grouping hardware. The programmable shader is operative to perform order-insensitive shader operations on the groups according to a first subset of an instruction set defined for a programmable shader, with two or more of the groups processed in parallel. The programmable shader hardware is also operative to perform order-sensitive shader operations on each of the groups in the sequential order according to a second subset of the instruction set defined for the programmable shader.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 3A and FIG. 3B illustrate examples of pixel grouping according to one embodiment.

DETAILED DESCRIPTION

Figure 1:
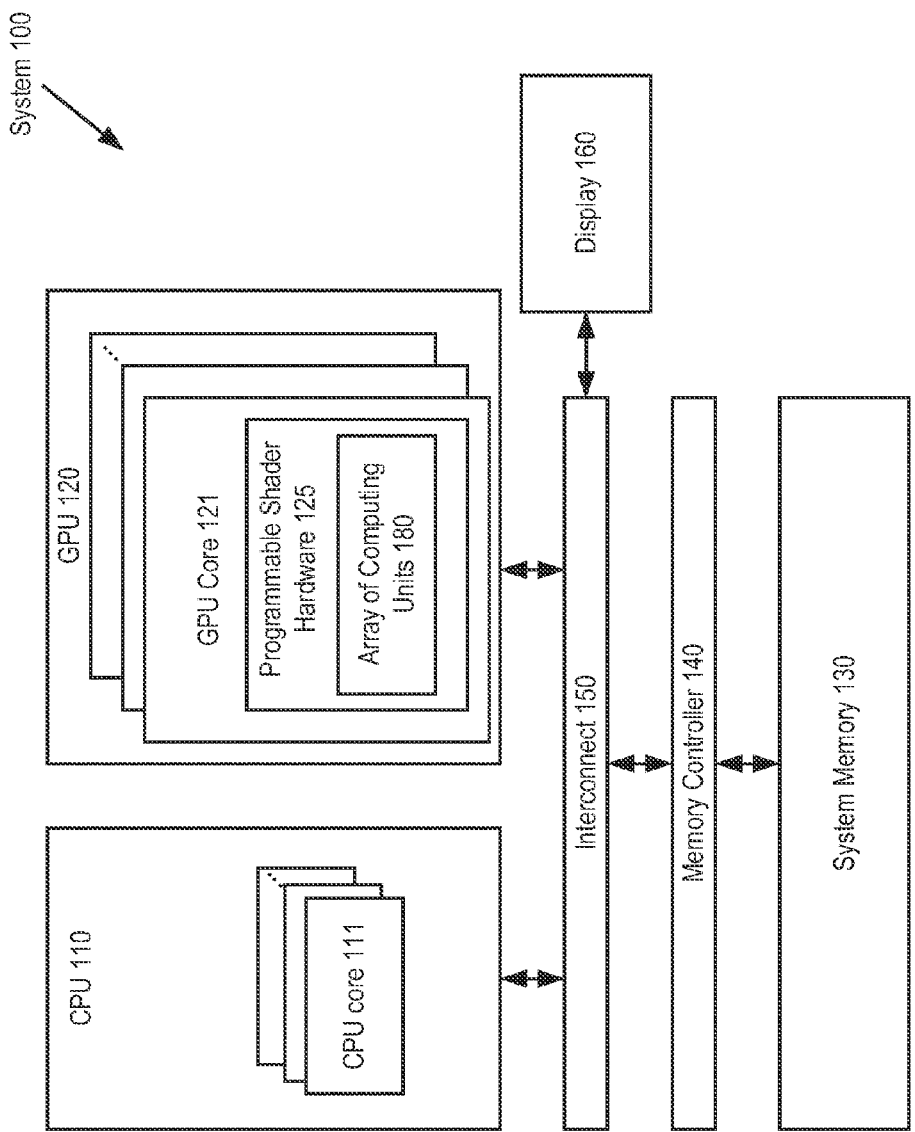
FIG. 1 illustrates a system according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention enable programmable shader hardware (also referred to as a programmable shader) to optimize the process of mixed order-sensitive and order-insensitive shader operations. An example of order-sensitive shader operations is alpha blending (also referred to as "blending" or "blending operations"), and an example of order-insensitive shader operations is fragment shading (also referred to as "fragment shader operations"). The "order" (to which an operation is either sensitive or insensitive) is typically defined in a graphics application program interface (API); e.g., an OpenGL API, by a graphics designer to indicate the order of rendering the primitives of a graphical scene.

As mentioned before, blending is typically performed by fixed-function hardware after fragment processing. To save cost, it is preferred to use the same piece of hardware for blending and fragment shading. However, mixing order-insensitive fragment shading with order-sensitive blending may cause performance degradation. Embodiments of the invention optimize such mixed operations.

One example of programmable shader hardware is a unified shader, which includes an array of computing units and a dynamic scheduling unit that distributes the shading tasks to the computing units. A unified shader typically has a large number of powerful computing units and is able to deliver a high throughput.

Existing programmable shaders can be programmed to perform vertex processing and fragment processing. A programmer can write a vertex shader program (also referred to as "vertex shader") for vertex processing and a fragment shader program (also referred to as "fragment shader") for fragment processing. These shader programs can be written in high-level languages such as OpenGL Shading Language (GLSL), High-Level Shading Language (HLSL) in Direct3D, or C for Graphics (Cg), etc. The computing units in a programmable shader can be assigned to different types of shading tasks on demand. For example, in a situation with light vertex workload and heavy pixel workload, more computing units or cycles can be assigned to processing the pixels in the fragment shader. On the other hand, in a situation with heavy vertex workload and light vertex workload, more computing units or cycles can be assigned to processing the vertices in the vertex shader.

Compared to a programmable shader, fixed-function hardware is less flexible because it limits blending to a number of generic blending formulas. Supporting additional blending formulas would increase the cost of fixed-function hardware.

With embodiments of the invention, programmable shader hardware can be utilized to perform blending in additional to fragment shading. The programmable shader can be programmed to compute any blending formulas, and its computing resources can be shared on demand between blending and other shading tasks.

Embodiments described herein can support both deferred rendering and immediate rendering. With deferred rendering, a display space is divided into multiple bins. The primitives accumulated from multiple graphical objects in the display space are rendered bin by bin, instead of primitive by primitive. When a bin is being rendered, its data can be temporarily stored in and accessed from an on-chip buffer to reduce the amount of system memory access. On the other hand, immediate rendering processes and renders primitives one primitive at a time. When the rendering process moves from one primitive to the next, immediate rendering typically causes repeated system memory reads and writes.

FIG. 1 illustrates a system 100 that includes a CPU 110 and a GPU 120 according to one embodiment. Although only one CPU and one GPU is shown, it is understood that the system 100 may include any number of CPUs and GPUs, as well as any number of other processors. In one embodiment, the system 100 may be implemented as a system-on-a-chip (SoC) that is used in a computing and/or communication system. Each CPU 110 may include multiple CPU cores 111 and each GPU may include multiple GPU cores 121. In one embodiment, the CPU 110 and the GPU 120 communicate with a system memory 130 (e.g., dynamic random-access memory (DRAM) or other volatile or non-volatile random-access memory) via a system interconnect 140 and a memory controller 150. The system 100 further includes a display 160 that displays images including the rendering output of the GPU 120. It is understood that many other system components are omitted herein for simplicity of illustration.

In one embodiment, the GPU 120 (more specifically, each GPU core 121) includes a programmable shader hardware 125 as part of its rendering pipeline for perform shading operations including at least fragment shader operations and blending. One example of the programmable shader hardware 125 is a unified shader that performs blending as well as vertex shading and fragment shading. The programmable shader hardware 125 includes an array of computing units 180 (e.g., arithmetic logic units (ALUs)) that execute instructions pre-defined in an instruction set. The instruction set is defined for the programmable shader hardware 125, and can be used to perform multiple different types of shading, including at least fragment shader operations and blending operations, according to standard or customized mathematical formulas. The array of computing units 180 perform integer and floating point operations, and can be scheduled to perform the operations sequentially and/or in parallel.

Figure 2:
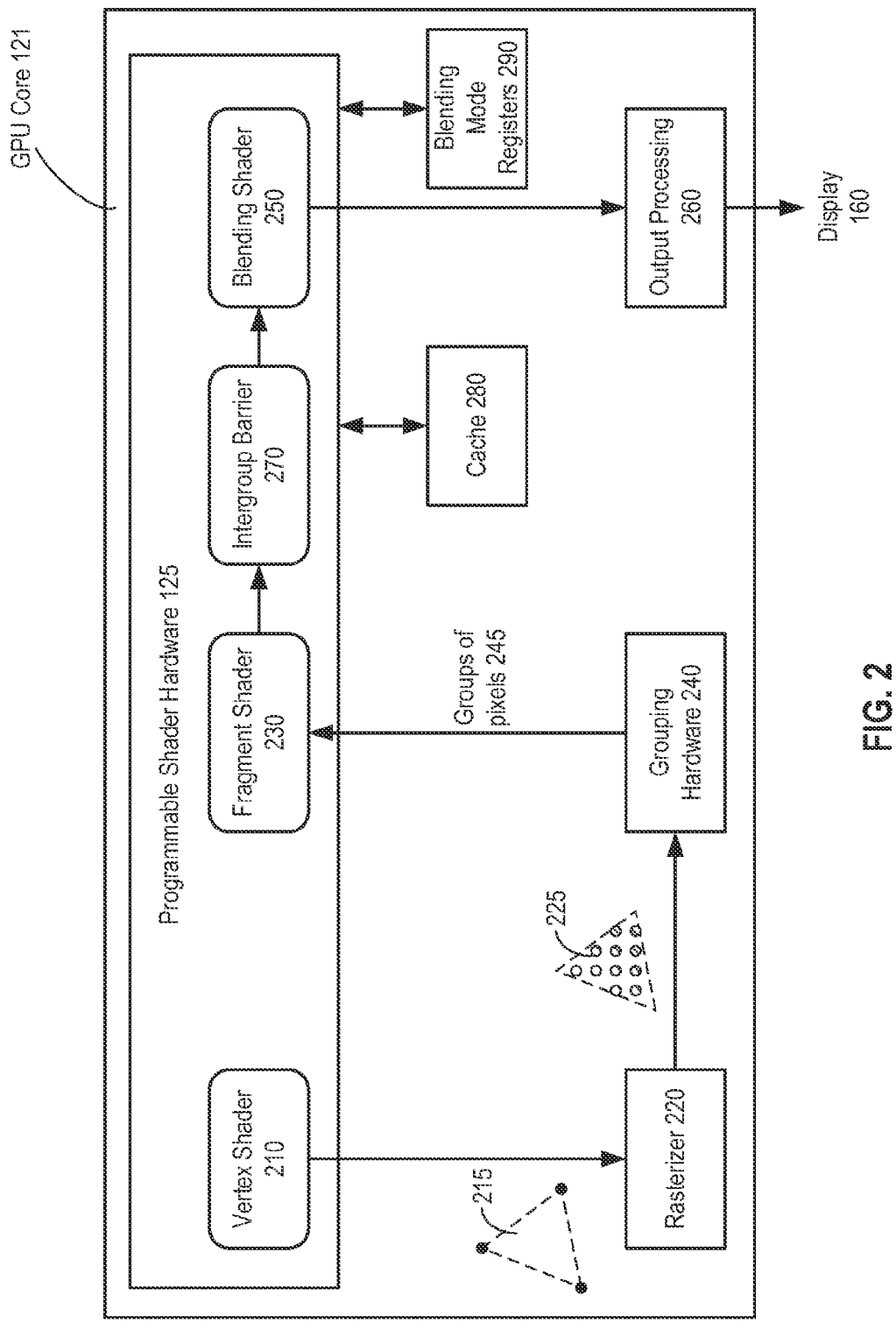
FIG. 2 illustrates functional blocks of a GPU core according to one embodiment.

FIG. 2 illustrates functional blocks of the GPU core 121 according to one embodiment. The functional blocks may be implemented by hardware or software. It is understood that in alternative embodiments, the GPU core 121 and programmable shader hardware 125 may include fewer, additional, and/or different functional blocks from what is shown in FIG. 2.

In the embodiment of FIG. 2, the programmable shader hardware 125 executes the function of a vertex shader 210. In an alternative embodiment, the vertex shader 210 may be implemented by a different hardware device. The vertex shader 210 receives graphical data describing the graphical objects to be rendered, and generates primitives to represent the graphical objects. Primitives are a set of the simplest geometric objects that the system 100 can draw and store; e.g., line segments, curves, triangles, polygons, etc. Each primitive is described by one or more vertices, which is a data structure including a set of attributes (e.g., position, color, normal, texture, etc.).

The vertices generated by the vertex shader 210 are not necessarily aligned with the pixel grid of the display 160 on which the graphical objects are to be rendered. A rasterizer 220 processes and interpolates each set of vertices to generate 3D pixels (e.g., pixels 225), which are enclosed within the primitive (e.g., primitive 215) defined by the vertices. The 3D pixels, also referred to as "pixels" for simplicity, are aligned with the pixel grid of the display 160. These pixels have the same attributes as the vertices, such as position, color, normal, texture, etc.

The output of the rasterizer 220 is sent to a grouping unit, which generates groups of pixels 245. In one embodiment, the grouping unit is implemented by hardware, hereinafter referred to as grouping hardware 240. The groups of pixels 245 form an ordered set of groups, in which the groups is sequentially ordered according to a graphics API requirement. The graphics API requirement specifies the order ("API order") in which a graphics application sends primitives to the GPU 120. The API order is used to sequence the primitives for rendering; specifically, for blending operations. The API order is also used for render state management or buffer resource management, which manages render state changes seen by the hardware.

In one embodiment, pixels are grouped according to at least two rules: (Rule 1) pixels within the same group do not overlap (i.e., none of the pixels within the same group are mapped to the same pixel location on the display), and (Rule 2) overlapped pixels (i.e., pixels that are mapped to the same pixel location on the display) are placed into different groups such that the API order is obeyed. Thus, a first pixel (which overlaps with a second pixel) of a prior primitive in the API order is placed into a prior group; the second pixel of a subsequent primitive in the API order is placed into a subsequent group.

FIG. 3A and FIG. 3B illustrate two examples of grouping operations performed by the grouping hardware 240 according to one embodiment. In both FIG. 3A and FIG. 3B, each primitive is a triangle and is labeled with a sequence number (shown in the examples as P1-P9) in the order specified by the API requirement. It is understood that the primitive may have a different shape than a triangle. For simplicity, instead of showing the vertices or pixels, dashed or dotted lines are used to represent the boundaries of each primitive.

Among P1-P9 received by the grouping hardware 240: P1-P5 do not overlap with each other, P6 and P7 do not overlap with each other, and P8 and P9 do not overlap with each other. Two primitives overlap when one primitive has at least one pixel that overlaps with a pixel of the other primitive. In the example of FIG. 3A, P6 and P7 overlap with P3 and P4. Thus, the grouping hardware 240 groups P1-P5, P8 and P9 into a first group (G1, shown in dashed lines), and P6 and P7 into a second group (G2, shown in solid lines). This group placement obeys Rule 1 because within each group none of the pixels overlap with each other. This group placement also obeys Rule 2 because overlapped pixels are placed into two different groups according to the API order. As P3 and P4 are prior to P6 and P7 in the API order, the group (G1) in which P3 and P4 are placed is also prior to the group (G2) in which P6 and P7 are placed. P8 and P9 can be placed into G1 because such placement does not violate either Rule 1 or Rule 2. The placement of P8 and P9 into G1 can be generalized as follows: a primitive (e.g., P8 or P9) sequenced after a second group (e.g., G2) according to the API order may be placed in a first group (e.g., G1, which is before the second group) if the primitive does not overlap with any other primitives in the first group and the second group.

In another example shown in FIG. 3B, P6 and P7 not only overlap with P3 and P4, but also overlap with P8 and P9. P1-P5 and P8 and P9 do not overlap with each other. In this example, the grouping hardware 240 groups P1-P5 into a first group (G1, shown in dashed lines), P6 and P7 into a second group (G2, shown in solid lines), and P8 and P9 into a third group (G3, shown in dotted lines). In this example, P8 and P9 cannot be placed into G1, because such placement would violate Rule 2. That is, since P8 and P9 overlap with P6 and P7, P8 and P9 cannot be placed in a group prior to the group (G2) in which P6 and P7 are placed.

The grouping operations may be performed on the pixels in one working area at a time. FIG. 3A shows an example of a working area 310 and FIG. 3B shows an example of a working area 320. If deterred rendering is implemented, each bin may be divided into a number of working areas. For example, if the bin size is 32×32 pixels and the working area is 16×16 pixels, each bin will be divided into four working areas. If deferred rendering is not implemented, the grouping operations can still be performed one working area at a time. However, this working area can be anywhere in the display space, not limited to a bin.

In the embodiment where grouping is performed by hardware, the size of the working area can affect the hardware cost. In one embodiment, a pixel mask having the size of the working area is assigned to each primitive that is present in a working area. The pixel mask value for a pixel location is set to one if a pixel is valid or visible at that pixel location; otherwise the pixel mask value is set to zero. A logical AND operation is then applied to two pixel masks of two primitives to determine whether the two primitives overlap.

Referring again to FIG. 2, the output of the grouping hardware 240 is an ordered set of groups, in which the sequential order of the groups is obeyed in the blending operations. The groups then enter a fragment shader 230, the function of which is executed by the programmable shader hardware 125. In one embodiment, the programmable shader hardware 125 executes instructions defined in the instruction set architecture to perform fragment shader operations. The fragment shader 230 performs texture and lighting operations on the individual primitives in the groups. The fragment shader operations are order-insensitive; that is, they can be performed on the groups in an arbitrary order that does not necessarily obey the sequential order of the groups. That is, the fragment shader 230 may operate on the groups in the sequential order, out of order, serially or in parallel. The primitives within a group can also be operated on in any arbitrary order. In one embodiment, the fragment shader 230 operates on multiple groups out of order or in parallel to keep the array of computing units 180 in the programmable shader hardware 125 fully utilized and to avoid stalls to the groups during the fragment shading process.

In one embodiment, an intergroup barrier 270 is placed between the fragment shader 230 and a blending shader 250 in the programmable shader hardware 125. More specifically, the function of the intergroup barrier 270 is executed after the fragment shader 230 and before the blending shader 250. The intergroup barrier 270 enforces the sequential order of the groups that enter the blending shader 250 for blending operations. Referring also to the examples of FIG. 3A and FIG. 3B, if G2 finishes fragment shader operations before G1, G2 will be stalled by the intergroup barrier 270 until G1 finishes blending operations.

The output of the intergroup barrier 270 enters the blending shader 250 in the sequential order (e.g., G1, G2, G3, . . . , etc.). As mentioned before, blending operations are order-sensitive; that is, they obey the sequential order of the groups. Although the sequential order of the group is strictly enforced for blending, the primitives within a group can undergo blending in any arbitrary order. In one embodiment, the programmable shader hardware 125 executes instructions defined in the instruction set architecture to perform blending operations, which typically can be described by a mathematical formula. For pixels that are not totally opaque, in one embodiment, the blending shader 250 performs alpha blending to blends color composition of the pixels into a background of the display. To perform alpha blending, each pixel in a group has an alpha value specifying its degree of transparency. The alpha is typically normalized to the range of [0, 1], with 0 denotes totally transparent and 1 denotes totally opaque. An example formula for alpha blending may have the form: $\alpha_{src}*c_{src}*(1-\alpha_{dst})+\alpha_{dst}*c_{dst}*(1-\alpha_{src})+\alpha_{src}*c_{src}*\alpha_{dst}*c_{dst}$, where $\alpha_{src}$ is the alpha value of the pixel being blended, $\alpha_{dst}$ is the alpha value of the background, $c_{src}$ is the color value of the pixel being blended, and $c_{dst}$ is the color value of the background. An example of a color value is a three-tuple vector (R, G, B) that indicates the values of red, green and blue. In one embodiment, the color values and alpha values are stored in a cache 280 to reduce read and write latency. In one embodiment, the cache 280 can be a static random access memory (SRAM) or a different type of RAM that resides on the same chip as the GPU core 121.

In one embodiment, the mathematical formula performed by the blending shader 250 can be selected from a number of pre-programmed formulas. The different blending formulas are also referred to as the blending modes. An instruction executed by the blending shader 250 can specify one of blending mode registers 290 to select a shader code segment for a pre-defined blending mode. Each blending mode register 290 stores a blending mode value and functions as a blending mode selector. According to the instructions being executed, the blending shader 250 can load different blending mode values from the blending mode registers 290 to perform different blending operations. In alternative embodiments, the blending formulas can be customized by instructions to suit the need of the graphics applications.

The blending shader 250 can process opaque pixels, transparent pixels, or a combination of opaque and transparent pixels. In one embodiment, for pixels that are totally opaque, the blending shader 250 may perform depth testing (also referred to as "z testing") to resolve visibility of the pixels across different groups. The depth testing determines which opaque surface is the nearest to the viewer, and is, therefore, visible to the viewer. In another embodiment, the depth testing may be performed by the rasterizer 220.

The output of the blending shader 250 is sent to output processing 260, which generates final pixel values that are written into a frame buffer for the display 160.

Figure 4:
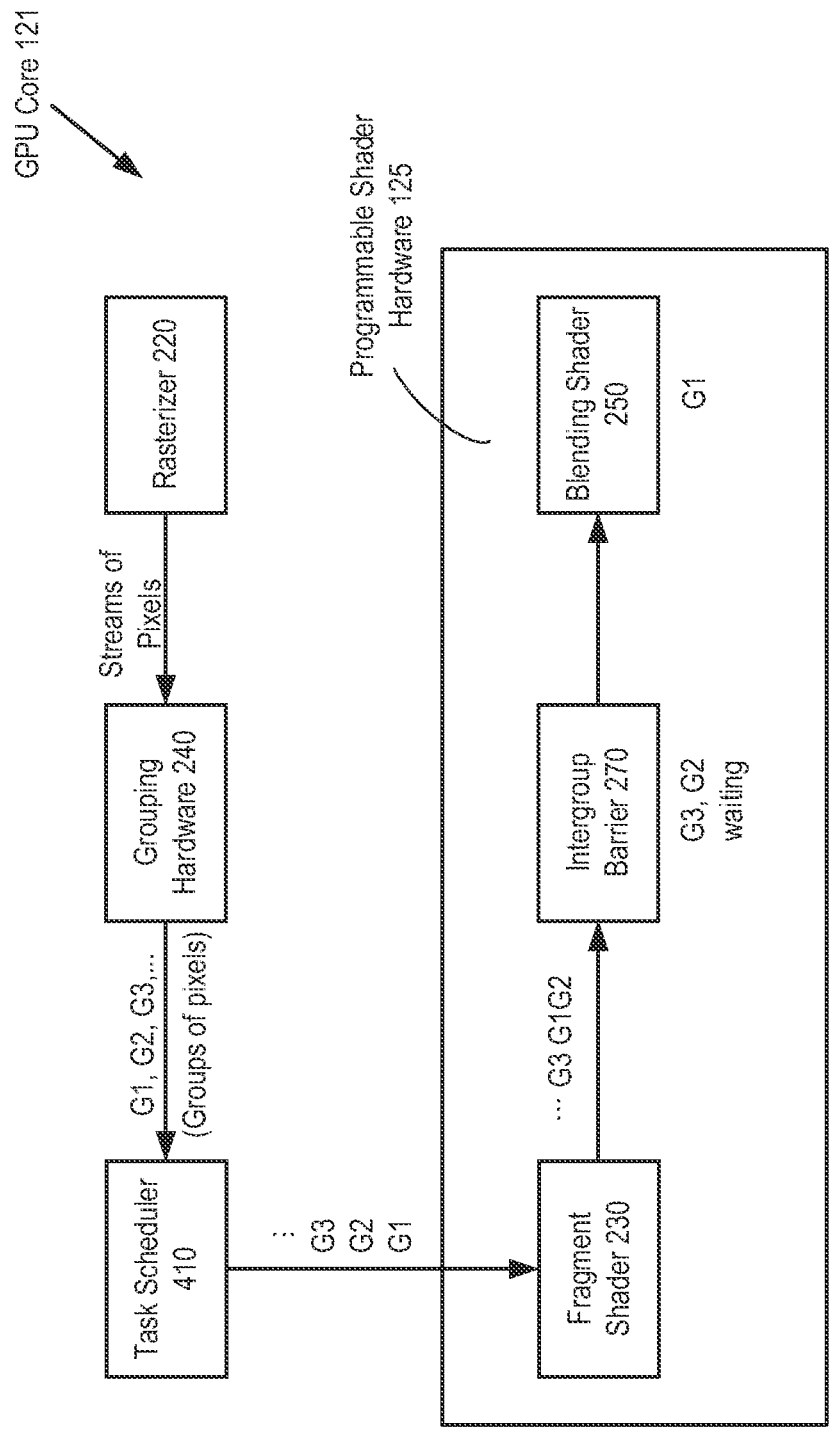
FIG. 4 illustrates operations performed by a programmable shader according to one embodiment.

FIG. 4 illustrates an example of the operations performed by the programmable shader hardware 125 according to one embodiment. As described before in connection with FIG. 2, the rasterizer 220 outputs a stream of pixels to the grouping hardware 240 for grouping. The groups formed by the grouping hardware 240 first enter a task scheduler 410. The task scheduler 410 schedules the groups for the computing units 180 of the programmable shader hardware 125 to execute the instructions of the fragment shader 230. The fragment shader 230 processes the groups in the order as specified by the task scheduler 410, which can be any arbitrary order including serial and parallel order, to maximize the utilization of the computing units 180. The output of the fragment shader 230 can be in any arbitrary order, because different groups may take different amount of time to finish fragment shading. In the example of FIG. 4, group G2 finishes fragment shading before G1. As G2 cannot surpass G1 to start the blending operations, G2 and the subsequent groups (e.g., G3) in the sequential order wait at the intergroup barrier 270 for G1 to finish fragment shader operations and blending operations.

Figure 5:
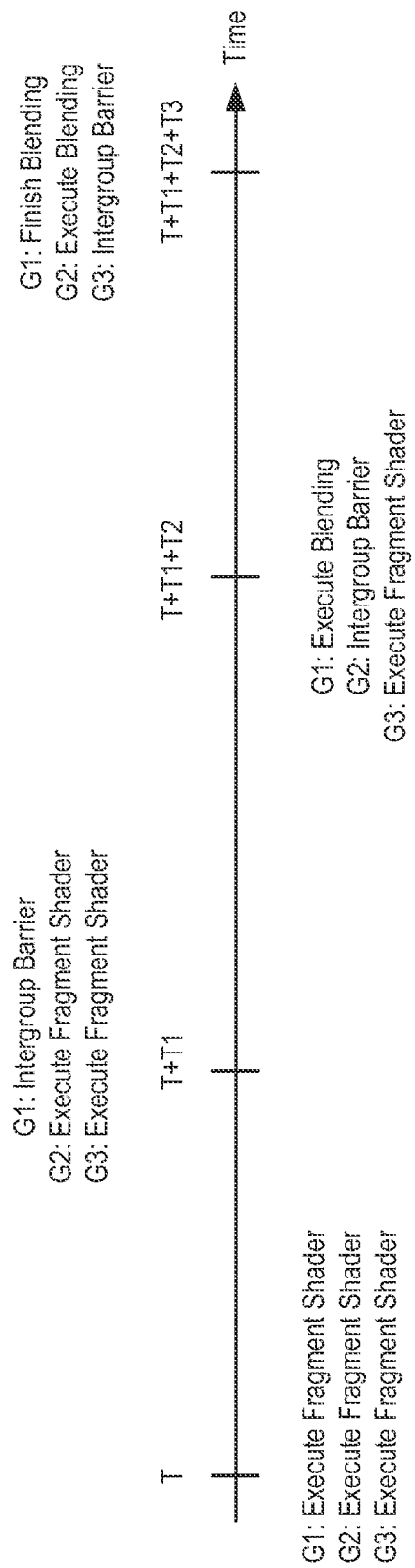
FIG. 5 is a flow diagram illustrating a method of a programmable shader according to one embodiment.

FIG. 5 illustrates an example of the operations performed by the programmable shader hardware 125 according to another embodiment. In this example, order-insensitive operations are shown as fragment shader operations, while order-sensitive operations are shown as blending operations. FIG. 5 shows the fragment shader operations, intergroup barrier and blending operations in a timeline. The time variables T, T1, T2 and T3 shown in FIG. 3 can be any positive numbers. At time T, the programmable shader hardware 125 executes fragment shader operations on all three groups G1, G2 and G3. At time T+T1, G1 finishes the fragment shader operations and encounters the intergroup barrier, while G2 and G3 continue the fragment shader operations. Since G1 is the first group in the sequence of groups being processed, the intergroup barrier does not stall G1 and allows G1 to start the blending operations. At T+T1+T2, G2 also finishes the fragment shader operations and encounters the intergroup barrier. Since G1 is still in the process of the blending operations, the intergroup barrier stalls G2 from starting the blending operations. At this time, G3 is in the process of fragment shader operations. At T+T1+T2+T3, G2 starts the blending operations after G1 has finished the blending operations. G3 is waiting at the intergroup barrier until G2 finishes the blending operations.

It is understood that in the example of FIG. 5, the three groups may finish the fragment shader operations in any order. However, the sequential order of the groups G1, G2 and G3 is enforced by the intergroup barrier so that the blending operations are executed according to the sequential order.

Figure 6:
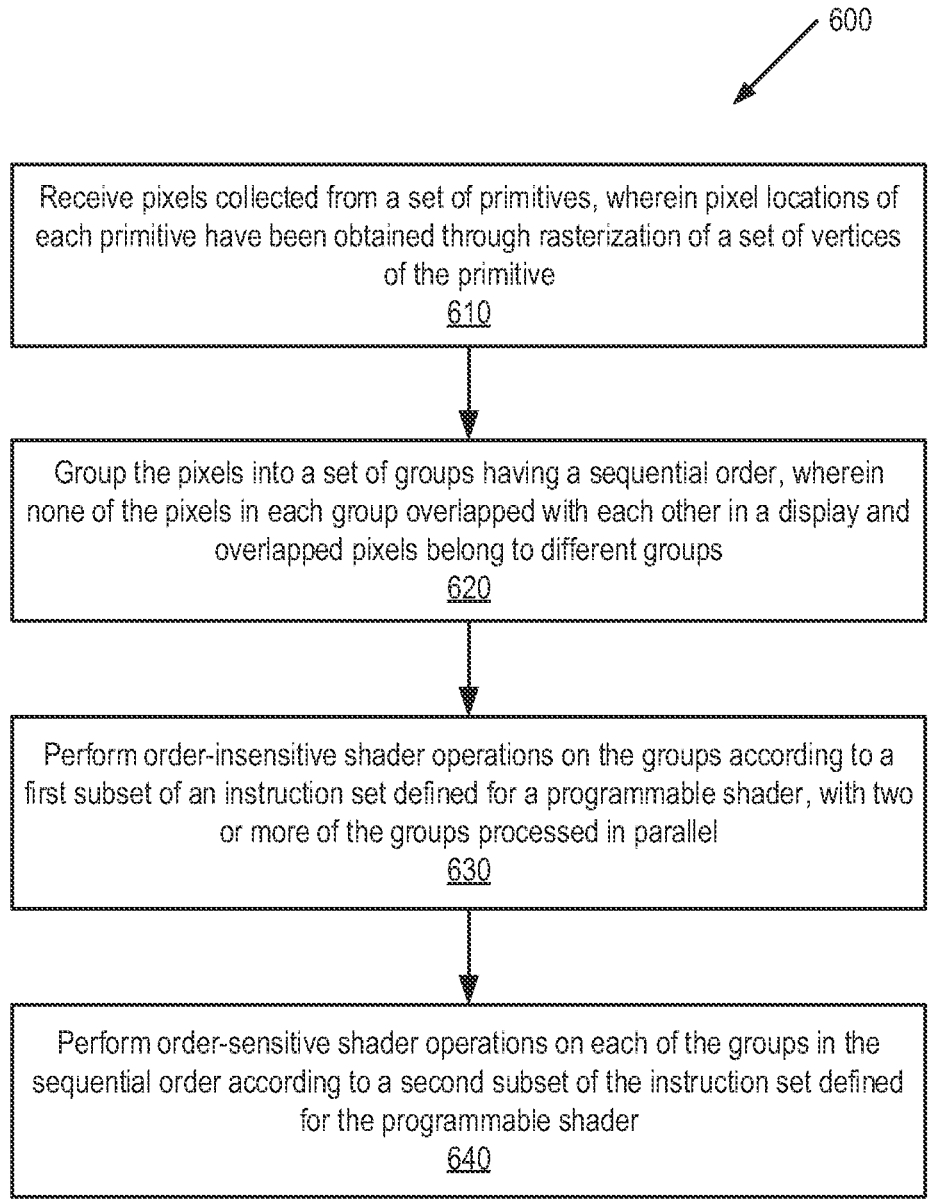
FIG. 6 is a flow diagram illustrating a method performed by a GPU according to one embodiment.

FIG. 6 is a flow diagram illustrating a method 600 of a GPU (e.g., the GPU core 125 of FIG. 2) according to one embodiment. In one embodiment, the method 600 begins when the GPU (more specifically, grouping hardware of the GPU) receives pixels collected from a set of primitives, wherein pixel locations of each primitive have been obtained through rasterization of a set of vertices of the primitive (block 610). The pixels are grouped into a set of groups having a sequential order, wherein none of the pixels in each group overlapped with each other in a display and overlapped pixels belong to different groups (block 620). The GPU then performs order-insensitive shader operations on the groups according to a first subset of an instruction set defined for a programmable shader (e.g., the programmable shader hardware 125 of FIGS. 1, 2 and 4), with two or more of the groups processed in parallel (block 630). The GPU also performs order-sensitive shader operations on each of the groups in the sequential order according to a second subset of the instruction set defined for the programmable shader (block 640).

In one embodiment, the sequential order of the groups is defined by a graphics API requirement that specifies an API order of sequencing the primitives for rendering. In one embodiment, the order-insensitive shader operations include fragment shader operations, and the order-sensitive operations include alpha blending.

The method 600 may be performed by hardware (e.g., circuitry, dedicated logic, programmable logic, microcode, etc.), software (e.g., instructions run on a processing device), or a combination thereof. In one embodiment, the method 600 is performed by the GPU 120 of FIG. 1 (or more specifically, the programmable shader hardware 125 of FIGS. 1, 2 and 4). In one embodiment, the GPU 120 may be part of a mobile computing and/or communication device (e.g., a smartphone, a tablet, laptop, etc.). In one embodiment, the GPU 120 may be part of a server system or a cloud computing system.

The operations of the diagrams of FIGS. 3, 5 and 6 have been described with reference to the exemplary embodiment of FIGS. 1, 2 and 4. However, it should be understood that the operations of the diagrams of FIGS. 3, 5 and 6 can be performed by embodiments of the invention other than those discussed with reference to FIGS. 1, 2 and 4, and the embodiments discussed with reference to FIGS. 1, 2 and 4 can perform operations different than those discussed with reference to the flow diagrams. While the diagrams of FIGS. 3, 5 and 6 shows a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of performing graphics operations using a Graphics Processing Unit (GPU) that includes a programmable shader, comprising:
receiving pixels collected from a set of primitives, wherein pixel locations of each primitive have been obtained through rasterization of a set of vertices of the primitive;
grouping the pixels into a set of groups having a sequential order, wherein each group is formed by the pixels of at least one primitive in a working area of a frame, and
wherein grouping the pixels further comprises: for each primitive within the working area, grouping all pixels of the primitive into a subsequent group if the primitive overlaps with at least one primitive in a prior group and does not overlap with any primitive in the subsequent group;
receiving instructions defined in an instruction set from a graphics application program executed by a system that includes the GPU;
executing the instructions in a first subset of an instruction set by the programmable shader to perform order-insensitive shader operations on each group, with two or more of the groups processed in parallel;
executing an intergroup barrier on each group when the group completes the order-insensitive shader operations, thereby ordering the groups in the sequential order for order-sensitive shader operations; and
for each group that has completed the order-insensitive shader operations, executing the instructions in a second subset of the instruction set by the programmable shader to perform the order-sensitive shader operations on the groups, wherein the groups are processed in the sequential order,
wherein an array of computing units of the programmable shader are operative to execute the instruction set to perform a mix of the order-insensitive shader operations and the order-sensitive shader operations, and are shared on demand between the order-insensitive shader operations and the order-sensitive shader operations,
wherein the order-sensitive operations include fragment shader operations, and the order-sensitive operations include alpha blending,
wherein the group includes a first group and a second group, the method further comprising:
executing the intergroup barrier on each group after the fragment shader operations to order the groups in the sequential order for the alpha blending;
performing the fragment shader operations on the first group and the second group; and
stalling the second group with the intergroup barrier when performing the blending operations on the first group.

2. The method of claim 1, wherein the pixels of overlapped primitives in the different groups follow the sequential order defined by a graphics application program interface (API) requirement that specifies an API order of sequencing the primitives for rendering.

3. The method of claim 2, wherein a primitive sequenced after a second group according to the API order is placed in a first group before the second group if the primitive does not overlap with any other primitives in the first group and the second group.

4. The method of claim 1, further comprising:
executing an instruction that specifies a blending mode register to select a shader code segment for a predefined blending mode.

5. The method of claim 1, wherein performing the order-sensitive operations further comprises:
performing the order-sensitive operations in an arbitrary order on the pixels within each of the groups.

6. The method of claim 1, wherein the order-sensitive operations include depth testing to resolve visibility of the pixels across different groups.

7. The method of claim 1, wherein performing the order-sensitive operations further comprises:
performing alpha blending on a set of pixels that include at least one of: transparent pixels, opaque pixels, and a combination of transparent pixels and opaque pixels.

8. A Graphics Processing Unit (GPU) comprising:
grouping hardware to receive pixels collected from a set of primitives, to group the pixels into a set of groups having a sequential order, wherein each group is formed by the pixels of at least one primitive in a working area of a frame, and wherein the grouping hardware is operative to: for each primitive within the working area, group all pixels of the primitive into a subsequent group if the primitive overlaps with at least one primitive in a prior group and does not overlap with any primitive in the subsequent group; and
programmable shader hardware coupled to the grouping hardware and including an array of computing units, wherein the array of computing units is operative to:
receive instructions defined in an instruction set from a graphics application program executed by a system that includes the GPU;
execute the instructions in a first subset of the instruction set to perform order-insensitive shader operations on each group, with two or more of the groups processed in parallel;
execute an intergroup barrier on each group when the group completes the order-insensitive shader operations, thereby ordering the groups in the sequential order for order-sensitive shader operations; and
for each group that has completed the order-insensitive operations, execute the instructions in a second subset of the instruction set to perform the order-sensitive shader operations on the group, wherein the groups are processed in the sequential order,
wherein the array of computing units are operative to execute the instruction set to perform a mix of the order-insensitive shader operations and the order-sensitive shader operations, and are shared on demand between the order-insensitive shader operations and the order-sensitive shader operations,
wherein the order-sensitive operations include fragment shader operations, and the order-sensitive operations include alpha blending,
wherein the group includes a first group and a second group, the programmable shader hardware further operative to:
execute the intergroup barrier on each group after the fragment shader operations to order the groups in the sequential order for the alpha blending;
perform the fragment shader operations on the first group and the second group; and
stall the second group with the intergroup barrier when performing the blending operations on the first group.

9. The GPU of claim 8, wherein the pixels of overlapped primitives in the different groups follow the sequential order defined by a graphics application program interface (API) requirement that specifies an API order of sequencing the primitives for rendering.

10. The GPU of claim 9, wherein a primitive sequenced after a second group according to the API order is placed in a first group before the second group if the primitive does not overlap with any other primitives in the first group and the second group.

11. The GPU of claim 8, wherein the programmable shader hardware is further operative to execute an instruction that specifies a blending mode register to select a shader code segment for a pre-defined blending mode.

12. The GPU of claim 8, wherein the programmable shader hardware is further operative to perform the order-sensitive operations in an arbitrary order on the pixels within each of the groups.

13. The GPU of claim 8, wherein the order-sensitive operations include depth testing to resolve visibility of the pixels across different groups.

14. The GPU of claim 8, wherein the programmable shader hardware is further operative to perform alpha blending on a set of pixels that include at least one of: transparent pixels, opaque pixels, and a combination of transparent pixels and opaque pixels.

* * * * *